United States Patent [19]

Cather, Jr.

[11] 4,258,927
[45] Mar. 31, 1981

[54] SHAFT SEAL WITH RETRACTABLE POLYTETRAFLUOROETHYLENE-LINED SEALING LIP

[75] Inventor: Douglas A. Cather, Jr., Gastonia, N.C.

[73] Assignee: Garlock Inc., Longview, Tex.

[21] Appl. No.: 969,162

[22] Filed: Dec. 13, 1978

[51] Int. Cl.³ .............................................. F16J 15/34
[52] U.S. Cl. .............................. 277/152; 277/DIG. 6
[58] Field of Search ................. 277/152, 153, DIG. 6, 277/157

[56] References Cited

U.S. PATENT DOCUMENTS

| 3,493,645 | 2/1970 | Sanderson et al. | 277/153 |
| 4,126,317 | 11/1978 | Bainard | 277/152 |

*Primary Examiner*—Robert I. Smith

[57] ABSTRACT

A shaft seal with a polytetrafluoroethylene-lined lip having the following dimensional criteria thus providing sufficient retraction to effect positive sealing against a smaller diameter shaft section after installation and stretching over a larger diameter shaft section:

(1) Lip Angle = 15°—25°;
(2) Included Angle—must be divergent axially from the flex secton;
(3) Clearance Diameter—must be greater than the shaft oversized step diameter;
(4) Lip Interference ≧ 125% of X (X is the difference between the diameters of the oversized shaft section and the diameter of the section to be sealed; and
(5) Lip Height ≧ 175% of X.

The above parameters are for seals to be used on shafts where there will be runout and/or angular shaft displacement. When there is no runout or angular shaft displacement, the seal parameters are identical to those listed above except that lip interference ≧ 100% of X, and lip height ≧ 150% of X.

The present invention also includes the method of installation of such seal and the combination of such seal and the shaft on which it is installed.

20 Claims, 3 Drawing Figures

U.S. Patent  Mar. 31, 1981  4,258,927
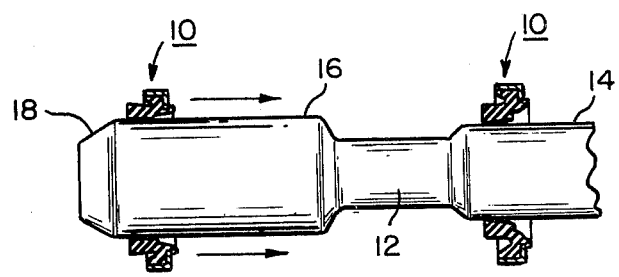
FIG. 1
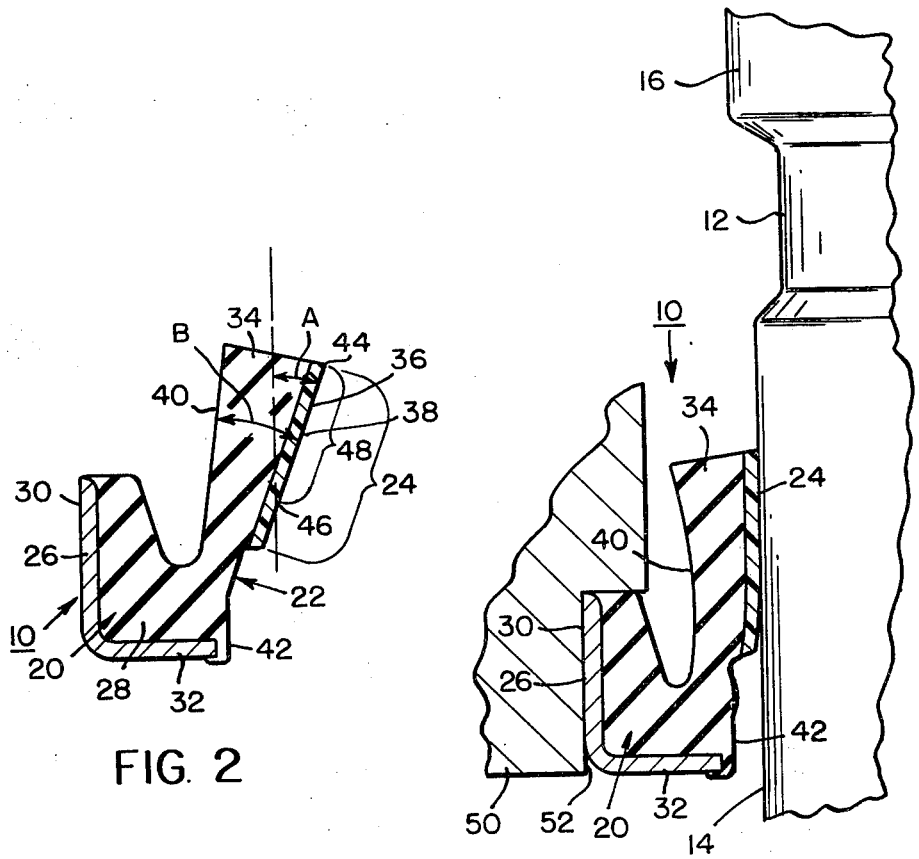
FIG. 2
FIG. 3

SHAFT SEAL WITH RETRACTABLE POLYTETRAFLUOROETHYLENE-LINED SEALING LIP

BACKGROUND OF THE INVENTION

1. Field of the Invention

This invention relates to shaft seals of the type having a polytetrafluoroethylene-lined elastomeric lip.

2. Description of the Prior Art

When a shaft seal having a polytetrafluoroethylene-lined elastomeric lip or a solid polytetrafluoroethylene lip (formed or unformed) is passed over a shaft section having a diameter larger than the lip I.D., the lip takes a set. Thus, when such seals must be passed over a significantly oversized step on a shaft with the requirement that the lip must then retract and seal against another section of the shaft of smaller diameter, the sealing lips thereof take a set resulting in insufficient interference between the lip and the shaft to effect positive sealing.

In the past, efforts to install seals over roughened or enlarged areas of shafts have been directed primarily to the use of special installation methods and tools rather than to new seal designs. The most common practice has been to employ a seal of standard design but stretched to an enlarged I.D. by means of a tapered hollow sleeve. The sleeve covers the enlarged portion on the shaft and the seal is pushed axially past the enlarged portion. The seal is pushed axially inwardly and then the installation sleeve is withdrawn axially outwardly thus permitting the seal lip to return to its original I.D. and thus into sealing engagement with the shaft. However, in some instances the degree of stretch has been excessive and the seal lip has been damaged. Such excessive stretch can result in a situation where the resilience of the seal lip is insufficient to maintain proper sealing contact with the shaft. In more extreme cases, the seal element may be stretched to the point of splitting. In those cases, a new seal must be substituted. Another problem which can be encountered is damage to the seal lip if there are any nicks or rough spots on the installation tool or sleeve.

My U.S. Pat. No. 4,126,316, issued Nov. 21, 1978 and entitled METHOD OF INSTALLING SHAFT SEAL WITH REFORMABLE SHELL describes one way to solve this problem. U.S. Pat. Nos. 2,804,325 and 2,804,324 show prior art designs of polytetrafluoroethylene-lined elastomeric seals. U.S. Pat. Nos. 3,356,376; 3,346,265 and 3,871,669 show prior art designs of elastomeric seals having small flex sections, and U.S. Pat. No. 3,825,271 shows a valve with an air expandable elastic member to vary the valve I.D.

It is an object of the present invention to provide a seal (and the method of installation thereof) with a polytetrafluoroethylene-lined elastomeric lip that can be installed over a larger diameter section of a shaft and can then retract and effect a positive seal against a smaller diameter section of the shaft. It is another object of this invention to provide a combination of such a seal and a shaft having two such different diameter sections.

SUMMARY OF THE INVENTION

A seal having a polytetrafluoroethylene-lined elastomeric lip, a method for installing the seal, and the combination of such seal and a shaft, wherein the seal can function to provide a positive seal against a shaft under conditions of runout and/or angular shaft displacement even after having been installed over a shaft section having a diameter larger than that which the seal must sealingly engage.

The sealing lip design of the present invention has the following dimensional criteria in order to provide for sufficient lip retraction to effect positive sealing after stretching takes place:

(1) Lip Angle = 15°–25°;
(2) Included Angle—must be divergent axially from the flex section;
(3) Clearance Diameter—must be greater than the shaft oversized step diameter;
(4) Lip Interference ≧ 125% of X (X is the difference between the diameters of the oversized shaft section and the shaft section to be sealed); and
(5) Lip Height ≧ 175% of X.

The above parameters are for seals to be used on shafts where there will be runout and/or angular shaft displacement. When there is no runout or angular shaft displacement, the seal parameters are identical to those listed above except that lip interference ≧ 100% of X, and lip height ≧ 150% of X.

BRIEF DESCRIPTION OF THE DRAWING

The present invention will be more fully understood by reference to the following detailed description thereof, when read in conjunction with the attached drawings, wherein like reference numerals refer to like elements and wherein:

FIG. 1 is a partly cross-sectional, partly plan view of a shaft having larger and smaller diameter sections and showing a seal of the present invention on each such section;

FIG. 2 is an enlarged partial sectional view of a seal according to the present invention shown in its free shape; and FIG. 3 is an enlarged partial cross-sectional view of the seal of this invention in sealing contact with a shaft.

DETAILED DESCRIPTION OF THE INVENTION

With reference now to the drawing, FIG. 2 shows a seal 10 according to the present invention in its free shape. FIG. 1 shows a shaft 12 having a first smaller diameter section 14 against which the seal 10 of this invention is to provide a seal and also a second larger diameter section 16 over which the seal 10 must pass and be stretched before installation onto the smaller diameter section 14 is completed. FIG. 1 also shows two seals 10 in contact with the two shaft sections 14 and 16 just for comparison of the configuration of the seals on each shaft section. In actual practice, of course, there would normally be just one seal on the shaft. FIG. 3 is an enlarged view showing the seal 10 in sealing contact with the shaft section 14.

The seal 10 is installed on the shaft 12 by moving the seal from left to right as shown by the horizontal arrows in FIG. 1, or by moving the shaft from right to left through the seal. In this way, the shaft does not oppose the seal during installation; that is, the sealing lip 24 is urged in a direction away from the mounting portion 20. However, if the shaft 12 is provided with a generous lead-in 18, then the above-mentioned direction of installation can be reversed.

FIG. 3 shows the seal 10 press-fitted in a bore 52 of a housing 50 and in sealing contact with the shaft 12. In this embodiment, the seal was first mounted in the bore 52 and the shaft was then inserted through the seal (in the vertically upward direction as viewed in FIG. 3). The polytetrafluoroethylene liner 36 had to expand as the second section 16 passed therethrough and then had to retract (or contract) back to a smaller I.D. to provide an effective positive seal with respect to the first section 14.

A seal made in accordance with the present invention is capable of contracting after stretching over an oversized shaft section and of providing a positive seal against a smaller shaft section even under conditions of runout and/or angular shaft displacement.

The seal 10 and its dimensional criteria will now be described in detail. The seal 10 includes a mounting portion 20, a flex portion 22 and a sealing lip 24. The mounting portion 20 includes a metal shell 26 bonded to a molded elastomeric body 28.

The shell 26 includes a cylindrical portion 30 and a radial flange 32. The flex portion 22 has a cross-sectional thickness sufficiently narrow to easily permit the necessary radial movement of the sealing lip 24. The sealing lip 24 includes an elastomeric backing layer 34 and a polytetrafluoroethylene liner 36 attached thereto in any known manner (such as by bonding). The elastomeric body 28, the flex portion 22 and the elastomeric backing layer 34 are all portions of one integral molded elastomeric member.

The seal 10 of the present invention is defined with respect to five dimensional parameters thereof which will now be described. The term "Lip angle" is hereby defined to mean the angle A shown in FIG. 2; that is, the as-molded acute angle between a shaft-contacting surface 38 of the sealing lip and the axis of the seal (or of the surface 14 of the shaft-shown in FIG. 2 by the vertical dashed line through the sealing lip 24). The term "included angle" of the sealing lip is hereby defined to mean the angle B shown in FIG. 2; that is, the as-molded angle between the two divergent surfaces (the I.D. surface 38 and an O.D. surface 40 of the sealing lip 24). The term "clearance diameter" is simply the I.D. of the surface 42 of the seal 10. The term "lip interference" is the difference between the diameter of the shaft surface (14) to be sealed and the diameter of the radially inner edge 44 of the sealing lip 24 when in its free shape. The term "Lip Height" is hereby defined to mean the axial distance 48 from the edge 44 to the point 46 where the shaft surface (14) to be contacted would intersect the as-molded sealing lip contact surface 38.

According to one embodiment of the present invention wherein the seal is to be used on a shaft where there will be runout and/or angular displacement, the above five dimensional parameters or criteria of the seal 10 must be, in combination, in accordance with the following:

(1) Lip Angle = 15°-25°;
(2) Included Angle—must be divergent axially from the flex section;
(3) Clearance Diameter—must be greater than the shaft oversized step diameter;
(4) Lip Interference ≧ 125% of X (X is the difference between the diameter of the oversized shaft section (16) and the diameter of the section (14) to be sealed); and
(5) Lip Height ≧ 175% of X.

One example of the present invention is for use on a shaft having a first sealing section (like section 14 in FIG. 1) with a diameter of about 0.875 inch and having a second oversized section (like section 16 in FIG. 1) wherein the value X is about 0.075 inch ("X" is the difference in diameters between said first and second sections). In this case the lip interference is ≧ 125% of X or ≧ 0.094 inch; and the lip height is ≧ 175% of X or ≧ 0.131 inch. The clearance diameter must be greater than 0.950 inch (0.875 + 0.075).

Another example is a shaft with a first section having a diameter of about 2.000 inch, and a value X of about 0.100. The clearance diameter must be greater than 2.100 inch. In this case the lip interference is ≧ 125% of X or 0.125 inch; and the lip height is ≧ 175% of X or ≧ 0.175 inch.

According to another embodiment of the present invention wherein the seal is to be used on a shaft where there will not be any runout and/or angular displacement, the above five dimensional parameters of the seal 10 must be, in combination, the same as is set forth above with the exception that the lip interference ≧ 100% of X and the lip height ≧ 150% of X.

One example of this embodiment is a seal for use on a shaft having a first section diameter of about 0.500 inch and a value X of about 0.025. The clearance diameter must be greater than 0.525 inch (0.500 + 0.025). In this case, the lip interference is ≧ 100% X or ≧ 0.025; and the lip height is ≧ 150% of X or ≧ 0.038.

Other examples are the two examples of the first embodiment used in the second embodiment and the one example of the second embodiment used in the first embodiment.

The invention has been described in detail with particular reference to the preferred embodiments thereof, but it will be understood that variations and modifications can be affected within the spirit and scope of the invention as described hereinafter and as defined in the appended claims.

I claim:

1. An apparatus comprising:
   (a) a shaft having a first smaller diameter section to be sealed by the below-recited seal and a second larger diameter section over which said seal must pass before contacting said first section; and
   (b) an annular shaft seal comprising:
      (i) a mounting portion comprising a shell and an elastomeric body bonded thereto;
      (ii) a flex portion of elastomeric material integral with said elastomeric body and extending axially therefrom and being of sufficiently narrow cross-section to permit radial movement of the below-recited sealing lip; and
      (iii) a sealing lip including an elastomeric backing layer and a polytetrafluoroethylene liner on a radially inner surface of said sealing lip, said elastomeric backing layer being integral with said elastomeric material of said flex portion, said liner being attached to said backing layer, and said seal having the following parameters:
         (1) Lip Angle = 15°-25°;
         (2) Included Angle—divergent axially away from said flex portion;
         (3) Clearance Diameter—greater than that of said second shaft section;
         (4) Lip Interference ≧ 100% of X wherein X is the difference between the diameters of said first and second shaft sections; and
         (5) Lip Height ≧ 150% of X.

2. An apparatus according to claim 1 wherein said first section has a diameter of less than about 1 inch and X ≧ about 0.050 inch.

3. An apparatus according to claim 1 wherein said first section has a diameter of about 0.500 inch, X has a value of about 0.025 inch.

4. An apparatus according to claim 1 wherein said lip interference ≧ 125% of X and said lip height ≧ 175% of X.

5. An apparatus according to claim 4 wherein said first section has a diameter of about 0.875 inch and X has a value of about 0.075 inch.

6. An apparatus according to claim 4 wherein said first section has a diameter of about 2.000 and X has a value of about 0.100 inch.

7. An apparatus according to claim 1 wherein said liner has a thickness of about 0.015 inch.

8. An apparatus according to claim 1 wherein said included angle is about 15°.

9. The method of mounting a shaft seal in a housing bore and between said bore and a shaft extending through said bore, and wherein said shaft has a first smaller diameter section to be sealed by said seal and a second larger diameter section over which said seal must pass before contacting said first section, and wherein said seal is of the type having polytetrafluoroethylene-lined elastomeric sealing lip, said method comprising the steps of:
(a) providing said seal with an annular shaft seal comprising:
(i) a mounting portion comprising a shell and an elastomeric body bonded thereto;
(ii) a flex portion of elastomeric material integral with said elastomeric body and extending axially therefrom and being of sufficiently narrow cross-section to permit radial movement of the below-recited sealing lip; and
(iii) a sealing lip including an elastomeric backing layer and a polytetrafluoroethylene liner on a radially inner surface of said sealing lip, said elastomeric backing layer being integral with said elastomeric material of said flex portion, said liner being attached to said backing layer, and said seal having the following parameters:
(1) Lip Angle = 15°–25°;
(2) Included Angle—divergent axially away from said flex portion;
(3) Clearance Diameter—greater than that of said second shaft section;
(4) Lip Interference ≧ 100% of X wherein X is the difference between the diameters of said first and second shaft sections; and
(5) Lip Height ≧ 150% of X;
(b) moving said seal axially relative to said shaft such that said seal passes over said second section before it reaches said first section; and
(c) mounting said seal in said bore and in sealing contact with said first section of said shaft, whereby after stretching over said second section, said sealing lip retracts a sufficient amount to effect a positive seal with said first section.

10. The method according to claim 9 wherein said moving step comprises moving said seal relative to said shaft in the direction such that said sealing lip is urged in a direction away from said mounting portion.

11. The method according to claim 9 wherein said moving step includes mounting said seal on a shaft having a first section diameter of about 0.500 inch and having a value X of about 0.025 inch.

12. The method according to claim 9 wherein said lip interference ≧ 125% of X and said lip height ≧ 175% of X.

13. The method according to claim 12 wherein said moving step includes mounting said seal on a shaft having a first section diameter of about 0.875 inch and having a value X of about 0.075 inch.

14. The method according to claim 12 wherein said moving step includes mounting said seal on a shaft having a first section diameter of about 2.000 inch and having a value X of about 0.100 inch.

15. An annular shaft seal comprising:
(a) a mounting portion comprising a shell and an elastomeric body bonded thereto;
(b) a flex portion of elastomeric material integral with said elastomeric body and extending axially therefrom and being of sufficiently narrow cross-section to permit radial movement of the below-recited sealing lip; and
(c) a sealing lip including an elastomeric backing layer and a polytetrafluoroethylene liner on a radially inner surface of said sealing lip, said elastomeric backing layer being integral with said elastomeric material of said flex portion, said liner being attached to said backing layer, and said seal having the following parameters:
(1) Lip Angle = 15°–25°;
(2) Included Angle—divergent axially away from said flex portion;
(3) Clearance diameter—greater than 0.950 inch;
(4) Lip Interference ≧ 0.094 and
(5) Lip Height ≧ 0.131 inch.

16. The seal according to claim 15 wherein said liner has a thickness of about 0.015 inch.

17. An annular shaft seal comprising:
(a) a mounting portion comprising a shell and an elastomeric body bonded thereto;
(b) a flex portion of elastomeric material integral with said elastomeric body and extending axially therefrom and being of sufficiently narrow cross-section to permit radial movement of the below-recited sealing lip; and
(c) a sealing lip including an elastomeric backing layer and a polytetrafluoroethylene liner on a radially inner surface of said sealing lip, said elastomeric backing layer being integral with said elastomeric material of said flex portion, said liner being attached to said backing layer, and said seal having the following parameters:
(1) Lip Angle = 15°–25°;
(2) Included Angle—divergent axially away from said flex portion;
(3) Clearance diameter—greater than 2.100 inch;
(4) Lip Interference ≧ 0.125 inch; and
(5) Lip Height ≧ 0.175 inch.

18. An annular shaft seal comprising:
(a) a mounting portion comprising a shell and an elastomeric body bonded thereto;
(b) a flex portion of elastomeric material integral with said elastomeric body and extending axially therefrom and being of sufficiently narrow cross-section to permit radial movement of the below-recited sealing lip; and
(c) a sealing lip including an elastomeric backing layer and a polytetrafluoroethylene liner on a radially inner surface of said sealing lip, said elastomeric backing layer being integral with said elastomeric material of said flex portion, said liner being attached to said backing layer, and said seal having the following parameters:
(1) Lip Angle = 15°–25°;
(2) Included Angle—divergent axially away from said flex portion;
(3) Clearance diameter—greater than 0.525 inch;
(4) Lip Interference ≧ 0.025 inch; and
(5) Lip Height ≧ 0.038 inch.

19. An annular shaft seal for use on a shaft having a first smaller diameter section to be sealed by said seal and a second larger diameter section said seal must pass over before engaging said first section, said seal comprising:
(a) a mounting portion comprising a shell and an elastomeric body bonded thereto;
(b) a flex portion of elastomeric material integral with said elastomeric body and extending axially therefrom and being of sufficiently narrow cross-section to permit radial movement of the below-recited sealing lip; and
(c) a sealing lip including an elastomeric backing layer and a polytetrafluoroethylene liner on a radially inner surface of said sealing lip, said elastomeric backing layer being integral with said elastomeric material of said flex portion, said liner being attached to said backing layer, and said seal having the following parameters:
(1) Lip Angle = 15°–25°;
(2) Included Angle—divergent axially away from said flex portion;
(3) Clearance Diameter—greater than that of said second section;
(4) Lip Interference ≧ 100% of X wherein X is the difference between the diameters of said first and second shaft sections; and
(5) Lip Height ≧ 150% of X.

20. The seal according to claim 19 wherein said lip interference ≧ 125% of X and said lip height ≧ 175% X.

* * * * *